US010194503B2

(12) United States Patent
Leadford et al.

(10) Patent No.: US 10,194,503 B2
(45) Date of Patent: Jan. 29, 2019

(54) COMPOSITE LIGHT SOURCE SYSTEMS AND METHODS

(71) Applicant: ABL IP Holding LLC, Conyers, GA (US)

(72) Inventors: Kevin F. Leadford, Evergreen, CO (US); Carl T. Gould, Golden, CO (US); Christopher J. Sorensen, Denver, CO (US); Christopher D. Slaughter, Denver, CO (US); Peter K. Nelson, Denver, CO (US)

(73) Assignee: ABL IP Holding LLC, Atlanta, GA (US)

( * ) Notice: Subject to any disclaimer, the term of this patent is extended or adjusted under 35 U.S.C. 154(b) by 302 days.

(21) Appl. No.: 14/677,618

(22) Filed: Apr. 2, 2015

(65) Prior Publication Data

US 2015/0289344 A1 Oct. 8, 2015

Related U.S. Application Data

(60) Provisional application No. 61/974,342, filed on Apr. 2, 2014.

(51) Int. Cl.
*H05B 33/08* (2006.01)
*H05B 37/02* (2006.01)

(52) U.S. Cl.
CPC ....... *H05B 33/086* (2013.01); *H05B 33/0863* (2013.01); *H05B 37/0281* (2013.01); *Y02B 20/42* (2013.01)

(58) Field of Classification Search
None
See application file for complete search history.

(56) References Cited

U.S. PATENT DOCUMENTS 5,272,603 A  12/1993  Camarota et al.
5,831,686 A  11/1998  Beretta
(Continued)

FOREIGN PATENT DOCUMENTS

JP  2008257903  10/2008
KR  100961236  6/2010
(Continued)

OTHER PUBLICATIONS

Minano, et al. "Newer Optics efficiently mix, dim, and color-tune LED light," retrieved from http://spie.org/x92346.xml on May 18, 2014, 4 pages.
(Continued)

*Primary Examiner* — Minh D A
*Assistant Examiner* — James H Cho
(74) *Attorney, Agent, or Firm* — Kilpatrick Townsend & Stockton LLP

(57) ABSTRACT

A composite light source includes a plurality of illumination panels, that emit light of a fixed color and a variable luminous intensity. Over time, the luminous intensities of at least two of the illumination panels vary, while a combined luminous intensity of the illumination panels remains about constant. Another composite light source includes a plurality of illumination panels that emit light. Each illumination panel of at least a first subset of the plurality of illumination panels emits the light with a first luminous intensity, and each illumination panel of at least a second subset of the plurality of illumination panels emits the light with a second luminous intensity that is different from the first luminous intensity.

12 Claims, 9 Drawing Sheets

(56) References Cited

U.S. PATENT DOCUMENTS

| | | | |
|---|---|---|---|
| 7,048,412 B2 | 5/2006 | Martin et al. | |
| 7,515,128 B2 | 4/2009 | Dowling | |
| 7,638,941 B2 | 12/2009 | Cok | |
| 7,679,281 B2 | 3/2010 | Kim et al. | |
| 7,722,220 B2 | 5/2010 | Van De Ven | |
| 8,299,716 B2 | 10/2012 | Melzner et al. | |
| 8,328,375 B2 | 12/2012 | Diekman et al. | |
| 8,829,822 B2 | 9/2014 | Laski et al. | |
| 2010/0284173 A1 | 11/2010 | Verjans et al. | |
| 2011/0205757 A1 | 8/2011 | Whyte | |
| 2012/0076404 A1 | 3/2012 | Bryant et al. | |
| 2012/0146066 A1* | 6/2012 | Tischler | H01L 27/156 257/89 |
| 2012/0206050 A1 | 8/2012 | Spero | |
| 2012/0300437 A1 | 11/2012 | Lu et al. | |
| 2014/0062316 A1 | 3/2014 | Tischler et al. | |
| 2014/0232288 A1* | 8/2014 | Brandes | H05B 33/0803 315/250 |
| 2014/0362566 A1 | 12/2014 | Tischler et al. | |
| 2014/0369038 A1 | 12/2014 | Tischler et al. | |
| 2015/0301781 A1* | 10/2015 | Ekkaia | G06F 3/1446 362/237 |
| 2015/0345724 A1 | 12/2015 | Leadford et al. | |
| 2016/0062023 A1 | 3/2016 | Itoh et al. | |

FOREIGN PATENT DOCUMENTS

| | | |
|---|---|---|
| WO | 2009/114076 | 9/2009 |
| WO | 2013/010582 | 1/2013 |
| WO | 2013/139621 | 9/2013 |
| WO | 2014/070684 | 5/2014 |

OTHER PUBLICATIONS

Unknown, et al. "IntelliWhite LED Lighting," retrieved from http://www.colorkinetics.com/ls/intelliwhite/intelliwhite.html on May 16, 2014, 1 pages.

International Search Report and Written Opinion for PCT Application No. PCT/US2017/028807, dated Jul. 26, 2017, 13 pages.

Non-Final Office Action for U.S. Appl. No. 14/807,398, dated Nov. 17, 2017, 16 pages.

Non-Final Office Action for U.S. Appl. No. 15/493,815, dated Dec. 12, 2017, 16 pages.

CA 2,964,921, "Office Action," dated May 11, 2018, 7 pages.

* cited by examiner

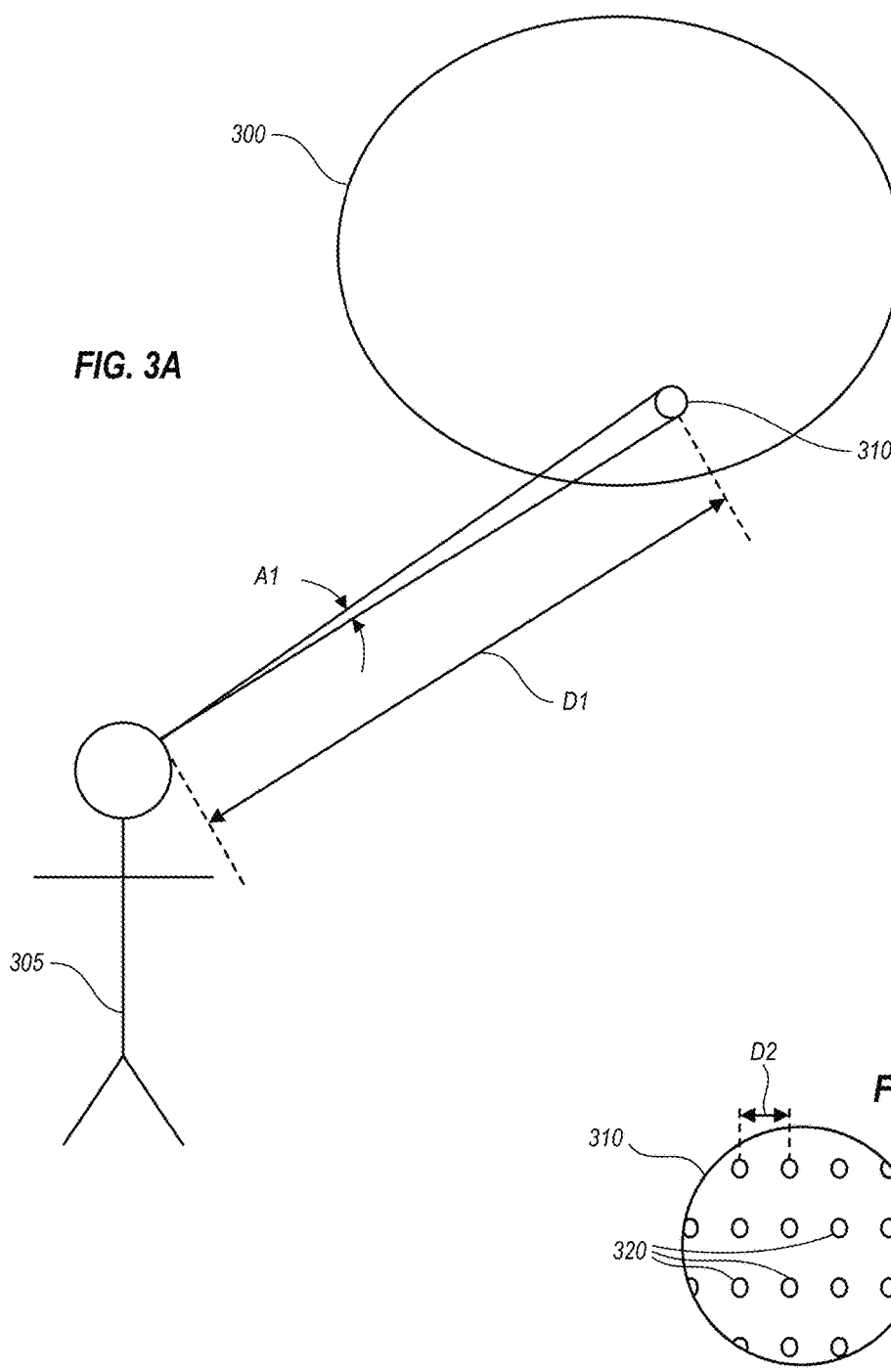

FIG. 4A
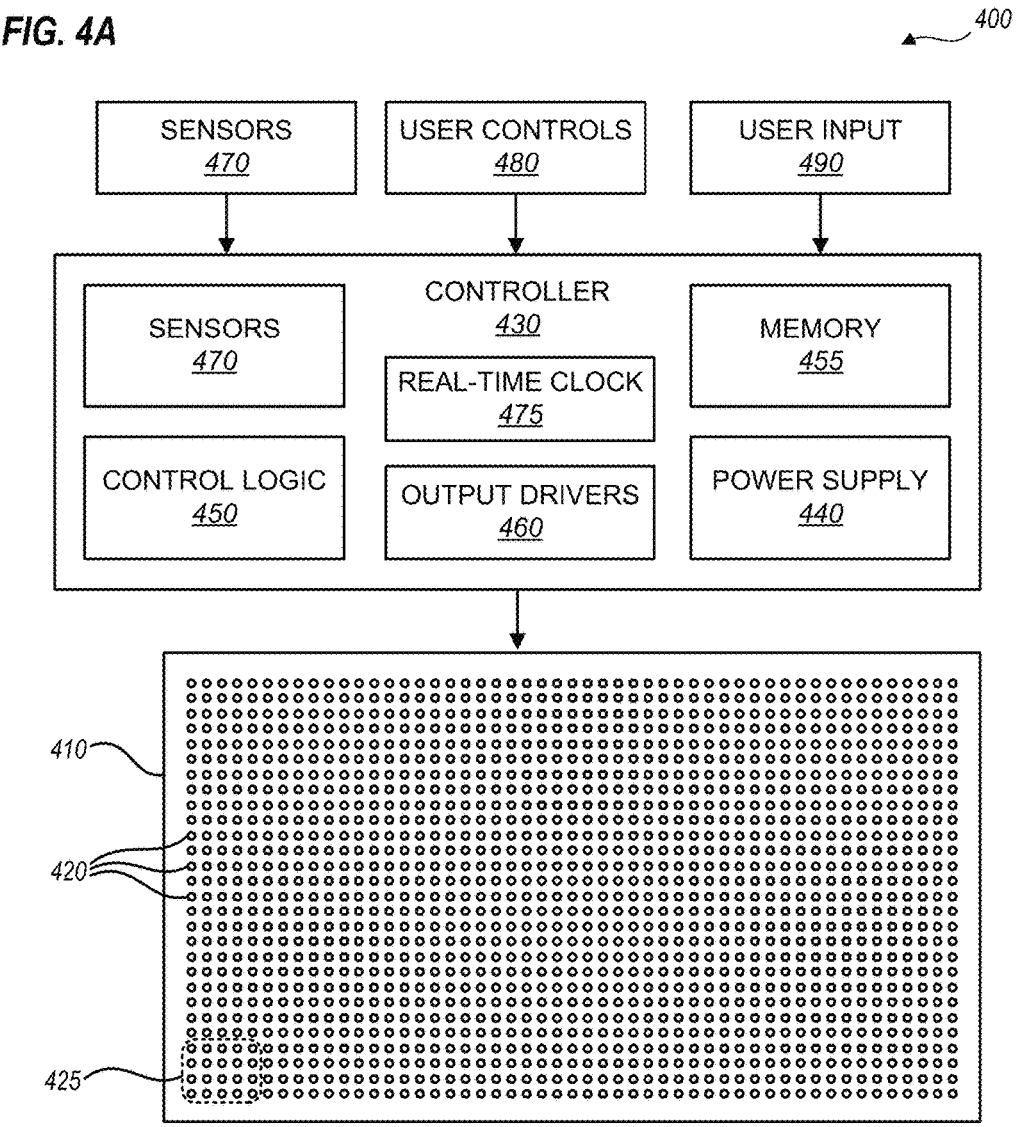
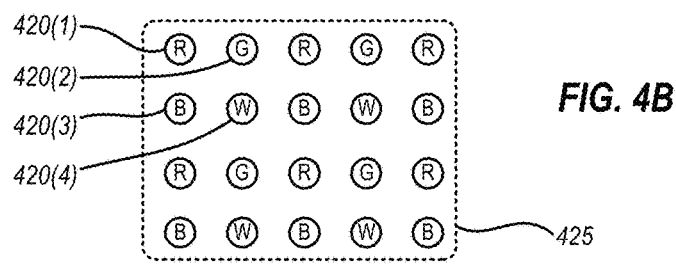
FIG. 4B

COMPOSITE LIGHT SOURCE SYSTEMS AND METHODS

CROSS-REFERENCE TO RELATED APPLICATIONS

This application claims the benefit of U.S. Provisional Patent Application No. 61/974,342, filed Apr. 2, 2014, which is incorporated by reference herein.

BACKGROUND

Luminaires for interior lighting are often designed for aesthetic appeal of the equipment when it is directly viewed, as well as for providing high quality illumination. Related design objectives generally include providing visually interesting components such as a housing and/or other structural components or light scattering or diffusing type elements. Examples of visually interesting components include wall- or ceiling-mounted fixtures, ornamental bases or stands of lamps, faceted glass, crystals, lampshades, and diffusers. Typically, the actual light-emitting devices within luminaires are more or less exempt from such design objectives, because users of the lighting generally will not be looking directly into the light-emitting devices, either due to discomfort, or because the light-emitting devices project light through shades or diffusers, or onto nearby surfaces to provide indirect lighting.

SUMMARY

Composite light source embodiments herein project light that is "white" or of another target color on distant surfaces. The light sources themselves include regions and/or point sources that are of different colors and/or luminous intensities, and may change in colors and/or luminous intensities over time while a luminous intensity distribution of projected light remains about constant.

In an embodiment, a composite light source includes one or more first illumination panels that emit light of a first color and one or more second illumination panels that emit light of a second color, each of the first and second illumination panels being discernible to a viewer thereof. The first color and the second color are complementary to each another, such that a far field photometric distribution produced by the composite light source is of a target color that is intermediate to the first color and the second color.

In an embodiment, a composite light source includes a plurality of light emitters, each of the light emitters emitting light of a fixed color, and a controller for controlling intensity of light emitted by each of the light emitters. The controller controls the light emitters to emit light corresponding to at least two luminous regions, the at least two luminous regions emitting composite light of a first color and a second color that are complementary to each another, such that a far field photometric distribution produced by the composite light source is of a target color that is intermediate to the first color and the second color.

In an embodiment, a method of controlling a composite light source includes controlling illumination panels of the composite light source to produce light of two or more complementary colors, such that a first far field photometric distribution produced by adding the two or more complementary colors is characterized by a first color and a first luminous intensity distribution. The method also includes controlling the illumination panels of the composite light source such that the two or more complementary colors change over time while remaining complementary, such that a second far field photometric distribution produced by adding the two or more complementary colors as they change over time is characterized by a second color that is about the same as the first color, and a second luminous intensity distribution that is about the same as the first luminous intensity distribution.

In an embodiment, a method of controlling a composite light source includes controlling illumination panels of the composite light source such that at least two of the illumination panels emit light of different luminous intensity. The method also includes controlling the illumination panels of the composite light source such that the luminous intensities of the light emitted by the at least two of the illumination panels change over time, while a combined luminous intensity of the illumination panels remains about constant.

In an embodiment, a composite light source includes a plurality of illumination panels, each of the illumination panels emitting light of a fixed color and a variable luminous intensity, wherein over time, the luminous intensities of at least two of the illumination panels vary, while a combined luminous intensity of the illumination panels remains about constant.

In an embodiment, a composite light source includes a plurality of illumination panels that emit light. Each illumination panel of at least a first subset of the plurality of illumination panels emits the light with a first luminous intensity, and each illumination panel of at least a second subset of the plurality of illumination panels emits the light with a second luminous intensity that is different from the first luminous intensity.

In an embodiment, a composite light source includes a plurality of illumination panels, each illumination panel emitting light characterized by a color. The light emitted by the plurality of illumination panels combines to form a far field photometric distribution characterized by a target color. The colors of the light emitted by the plurality of illumination panels are controlled such that the colors of the light emitted by at least some of the plurality of illumination panels change over time, and the color changes of the light emitted by the at least some of the plurality of illumination panels are complementary with respect to the target color, such that the far field photometric distribution is characterized by the target color remaining about constant over time.

In an embodiment, a composite light source includes a plurality of illumination panels that emit light characterized by a luminous intensity. The light emitted by the plurality of illumination panels combines to form a far field photometric distribution characterized by a luminous intensity at each given angle from the composite light source. The luminous intensities of the light emitted by the plurality of illumination panels are controlled such that the luminous intensities of the light emitted by at least some of the plurality of illumination panels change over time, and the luminous intensity changes of the light emitted by the at least some of the plurality of illumination panels are complementary, such that the far field photometric distribution is characterized by the luminous intensity at each given angle from the composite light source remaining about constant over time.

In an embodiment, a composite light source includes light emitting means, and means for forming light emitted by the light emitting means into regions of the composite light source. At a first time, the composite light source utilizes the means for forming light to form the light from a plurality of first luminous regions. Each of the first luminous regions is discernible to a viewer as having a first spatial distribution on the composite light source, a first color and a first luminous intensity at the first time, and a far field distribution of the composite light source is characterized by a target color and a luminous intensity distribution at each given angle from the composite light source at the first time. At a second time, the composite light source utilizes the means for forming light to form the light from a plurality of second luminous regions. Each of the second luminous regions is discernible to a viewer as having a second spatial distribution on the composite light source, a second color and a second luminous intensity at the second time. A far field distribution of the composite light source is characterized by a target color and a luminous intensity distribution at each given angle from the composite light source at the second time. At least one of the target color and the luminous intensity distribution at each given angle from the composite light source do not change from the first time to the second time.

BRIEF DESCRIPTION OF THE DRAWINGS

Embodiments are described in detail below with reference to the following figures, in which like numerals within the drawings and mentioned herein represent substantially identical structural elements.

FIGS. 3A and 3B illustrate a minimum resolvable feature from the perspective of a viewer of a luminaire, and features that are less than the minimum resolvable.

FIG. 4A schematically illustrates components of a composite light source, in accord with an embodiment.

FIG. 4B schematically illustrates light emitters in a portion of the composite light source of FIG. 4A.

DETAILED DESCRIPTION

The subject matter of embodiments of the present invention is described here with specificity to meet statutory requirements, but this description is not intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Each example is provided by way of explanation, and not as a limitation. For instance, features illustrated or described as part of one embodiment may be used on another embodiment to yield a further embodiment. Thus, it is intended that this disclosure includes modifications and variations.

Composite light source systems and methods are disclosed according to various embodiments. These systems and methods generally provide lighting characterized by a far field photometric distribution of projected light that is constant (or nearly constant) in color and/or illuminance on sufficiently distant surfaces, but in a direct view, have discernible luminous regions that may vary in color, luminance and/or movement. The luminous regions may be provided with colors and/or luminance differences that are complementary to one another, such that in certain embodiments, a far field photometric distribution obtained by taking a sum of light received from each of the regions is a composite that is about constant in color and/or luminous intensity, even though individual luminous regions may be of various colors and may vary in luminance. In these and other embodiments, the luminous regions may vary in luminance, shape and/or color over time, with such variations being coordinated so that the far field photometric distribution obtained from the sum of the regions remains constant in color and/or luminous intensity at any given angle, despite the variations that can be discerned by looking directly at the regions. The light source systems themselves may also be composites of multiple illumination panels, and/or multiple light emitting elements (e.g., small or "point" light sources. Illumination panels may include planar or curved surfaces, or even three dimensional volumes, while light emitting elements may be, for example, individual light emitting diodes (LEDs) that are controlled to present an appearance of luminous regions.

Figure 1:
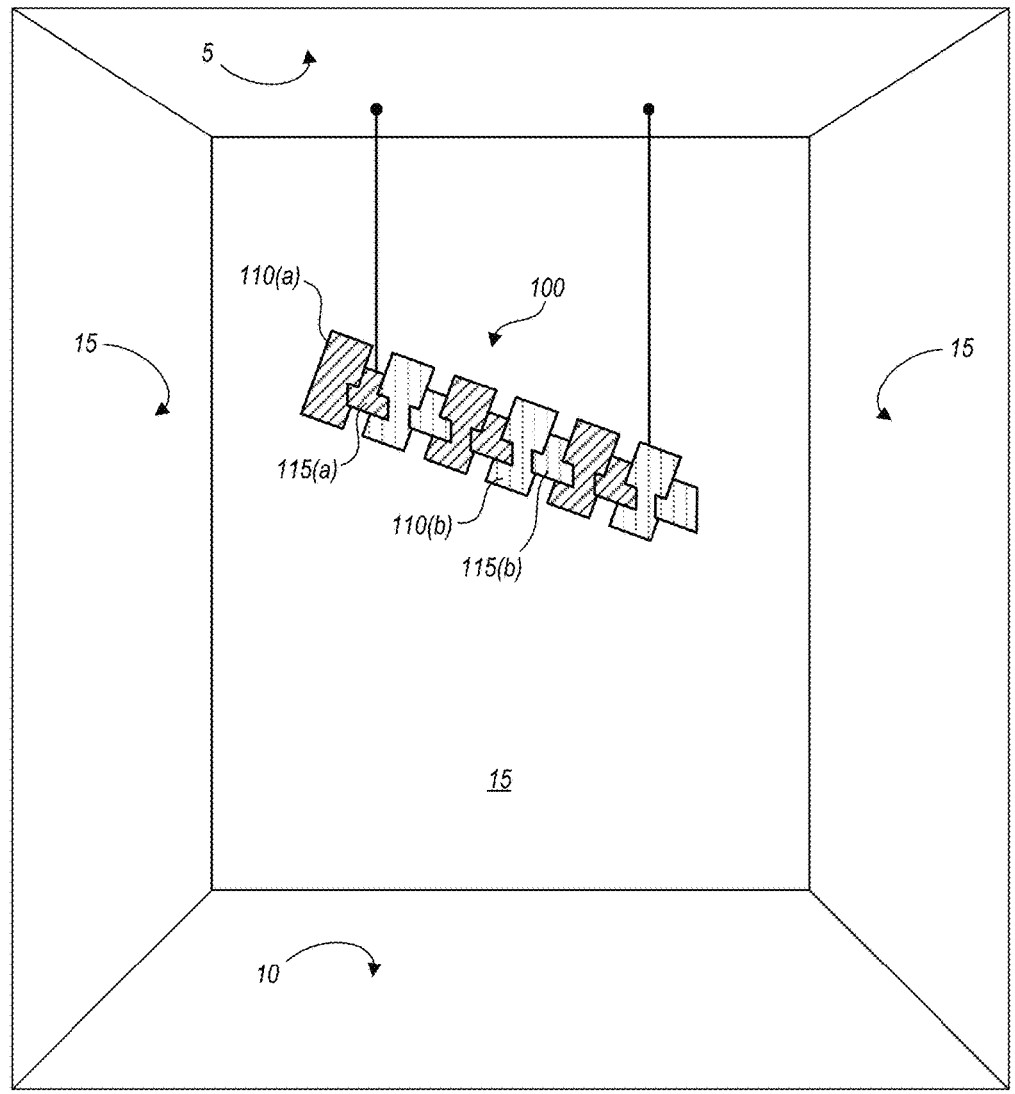
FIG. 1 is a schematic perspective view of a composite lighting system illuminating an interior space, according to an embodiment.

FIG. 1 is a schematic perspective view of a composite light source 100 illuminating an interior space, according to an embodiment. Light source 100 includes first illumination panels 110(*a*) and 110(*b*) and second illumination panels 115(*a*) and 115(*b*). As shown in FIG. 1, light source 100 includes three each of panels 110(*a*), 110(*b*), 115(*a*) and 115(*b*), but composite lighting systems herein are not limited to the numbers or shapes of panels shown in FIG. 1. That is, a composite lighting system may be of any shape, with the term "illumination panel" herein meaning any portion of the system that emits light characterized as being of a given color and/or luminance at a given time. Light source 100 is suspended from a ceiling 5 of the interior space such that light from light source 100 reaches ceiling 5, a floor 10 and walls 15; only three of walls 15 are shown in FIG. 1 for clarity of illustration. In light source 100, panels 115 are arranged at ninety degree angles with respect to panels 110 such that light from panels 110 and 115, collectively, emits at least a portion of light from illumination panels denoted as (a) and (b) in various directions, and an amount of light received from the (a) and the (b) panels at any given point is approximately equal.

The operation of composite light source 100 is but one example of a composite lighting system, as now explained. Illumination panels 110(*a*) and 115(*a*) emit light of a first color, and illumination panels 110(*b*) and 115(*b*) emit light of a complementary second color; the first and second colors are chosen such that a sum of light projected from the illumination panels 110 and 115 yields a target color (which may be, at least approximately, "white" light, as discussed further below) at a distance from light source 100. That is, in a direct view, the individual colors of the (a) and (b) illumination panels will be visible to an observer, but the target color will be projected on surfaces illuminated by composite light source 100 and will thus provide ambient lighting for the illuminated space (e.g., in FIG. 1, ceiling 5, walls 15, floor 10 will be illuminated in the target color). For example, panels 110(*a*) and 115(*a*) may emit light that is blue, while panels 110(b) and 115(b) emit light that is yellow. At a distance, the sum of light emitted by the (a) and (b) panels in their respective complementary colors yields the target color or "white" light. The concept of using complementary pairs or higher multiples of light sources is explained further below in connection with FIG. 2.

Furthermore, light emitted by panels 110(a), 115(a) may either be static, or may vary in color and/or luminance over time, with light emitted by panels 110(b), 115(b) varying correspondingly in color and/or luminance so that the sum of the light from all panels 110, 115 continues to yield approximately constant "white" light, or constant light of some other target color. The complementary colors emitted by panels designated as (a) and (b) above are sometimes referred to herein as forming a color set; color sets herein may include any number of colors that combine to form a target color. When a composite light source herein includes illumination panels and/or other light emitters that provide varying color and/or luminance of light over time, such variation may be controlled such that a far field photometric distribution of the light source (e.g., a measurement of the overlapping light projections of all such panels and/or light emitters on sufficiently distant surfaces) remains about constant for any given angle from the light source. Variations in ambient light of up to about +/−10% of total luminous intensity at a given angle and within a 10 step MacAdam ellipse in color are relatively insignificant to a human observer and may be considered "about constant" or "about the same" in the context of far field photometric distributions of embodiments herein. In embodiments, it may be advantageous to limit variations in ambient light to within +/−5% of total luminous intensity at a given angle and within a 5 step MacAdam ellipse in color to limit variations that may be barely visible but possibly distracting.

Further embodiments of composite lighting systems and methods are described further below in connection with FIGS. 2-6. Such embodiments are generally characterized by a far field distribution of light that is "white" (or another target color) and is nearly constant in luminous intensity over time, but may include individual luminous regions that emit light of complementary colors and/or of varying luminance and that may vary over time. Again, "nearly constant" luminous intensity herein refers to intensity that is within +/−10%, but embodiments may limit intensity variations to within +/−5% or less. "White" or other target color may be chosen as any of several points or regions of applicable color and/or luminance within a color diagram, as discussed below in connection with FIG. 2. The complementary colors emitted by the luminous regions are not limited to pairs of colors but may include complementary triplets or higher order multiples of colors that sum to the target color. In embodiments, luminous regions are not limited to fixed panels or other light emitters, but may be variable in form, shape, area and/or boundaries, and may overlap one another. For example, luminous regions may be formed by local variations in luminance among a plurality of light emitters that are arranged within a space or across one or more surfaces.

Figure 2:
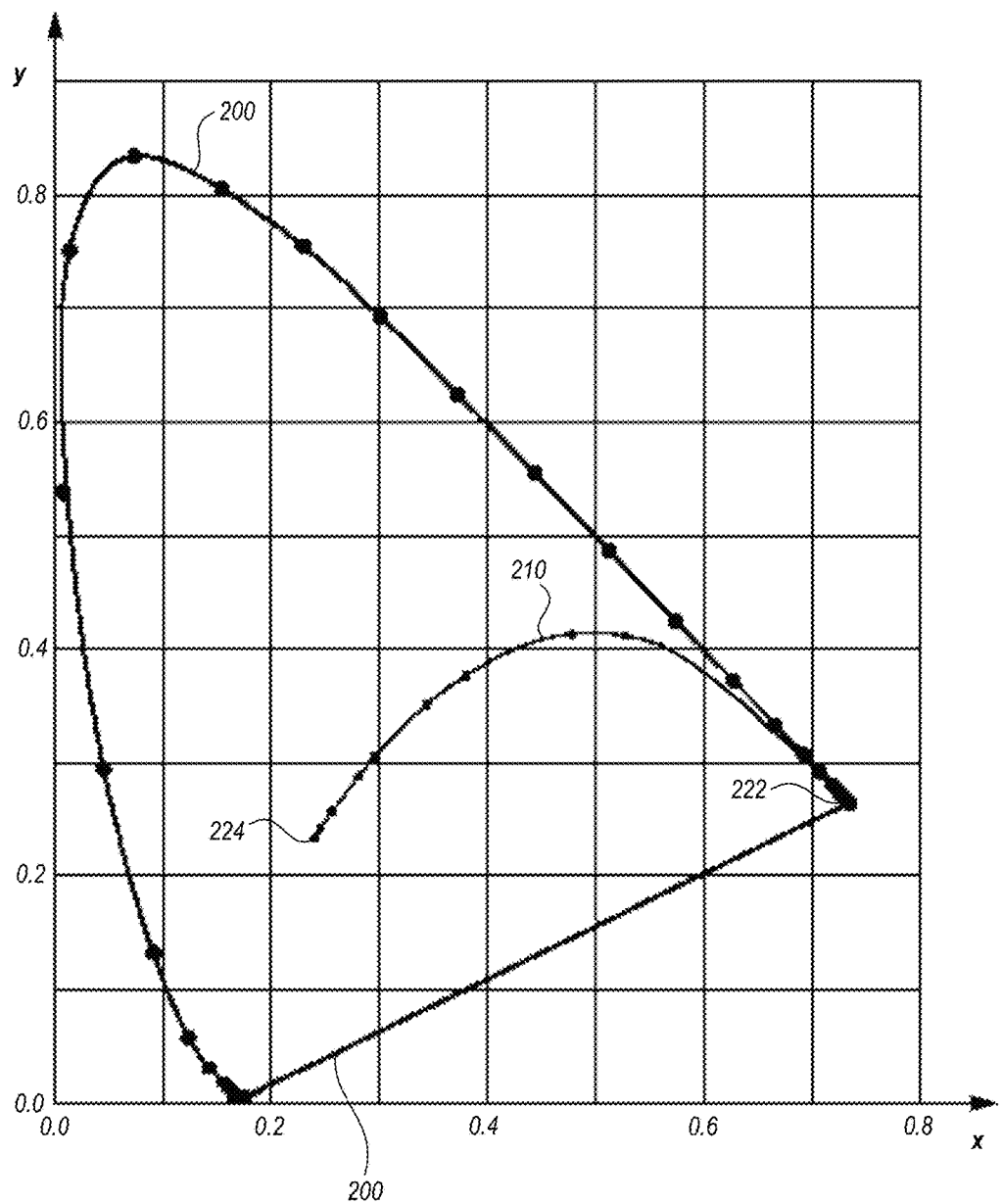
FIG. 2 schematically illustrates the concepts of "white" and "complementary colors" in accord with embodiments herein.

FIG. 2 schematically illustrates the concepts of "white" and "complementary colors" in accord with embodiments herein. Outline 200 bounds a locus of points according to the well-known CIE 1931 color space. In FIG. 2, the horizontal x axis and the vertical y axis correspond respectively to the x, y chromaticity coordinates of a given point. Points along outline 200 correspond to completely saturated colors ranging from 400 to 700 nm, going clockwise from the bottom of the plot (around x=0.18, y=0) around to the right hand corner point (around x=0.73, y=0.26). The line connecting these two points represents a range of purple.

A line 210 within outline 200 is the Planckian locus, which corresponds to the peak wavelengths of distributions that are emitted by black bodies at temperatures ranging from low (e.g., less than 500C) at the point labeled 222, to infinitely high, at the point labeled 224.

A portion of the Planckian locus (e.g., color temperatures from around 2700K to 6500K) generally corresponds to color perceived by humans as "white." Embodiments herein consider "white" to be any point having a chromaticity within +/−0.05 Duv from the Planckian locus, where Duv is as defined in ANSI C78.377-2008.

The following discussion relates to how pairs (or triplets, or higher order multiples) of colors may be considered "complementary" in embodiments, with reference to color definitions within the CIE 1931 color space. If a luminaire has multiple luminous regions, each producing one of multiple (at least two) luminous colors, then chromaticities of these colors can be chosen in conjunction with luminances and areas of their respective luminous regions. If chosen in this way, a net far-field output of the luminaire (the sum of the contributions of each of the luminous regions) can be effectively white light, in that it will render objects as if coming from a white light source, even though the luminaire will have a colorful direct view appearance.

To determine appropriate chromaticity for n (at least two) distinct colors of light, let $x_i$, $y_i$ be the CIE chromaticity coordinates x, y of the $i^{th}$ color out of a series of n colors. Additionally, let $Y_i$ be the effective luminous content (e.g., a total flux of that color if every luminous region has the same relative far-field luminous intensity distribution, or if not, a total far-field luminous intensity of that color in a given direction) of the $i^{th}$ color. To determine a net chromaticity of the luminaire's light output, each represented color can be converted from coordinates in the xyY color space to XYZ tristimulus values as follows:

For every I, $$X_i = x_i \cdot \frac{Y_i}{y_i} \quad \text{(Eq. 1)}$$

$$Y_i = Y_i \quad \text{(Eq. 2)}$$

$$Z_i = (1 - x_i - y_i) \cdot \frac{Y_i}{y_i} \quad \text{(Eq. 3)}$$

From the results of Eqs. 1-3, the XYZ tristimulus values of the net luminaire output are simply respective sums of the X, Y and Z values of the n represented colors:

$$X_m = \sum_{i=1}^{n} X_i \quad \text{(Eq. 4)}$$

$$Y_m = \sum_{i=1}^{n} Y_i \quad \text{(Eq. 5)}$$

$$Z_m = \sum_{i=1}^{n} Z_i \quad \text{(Eq. 6)}$$

where $X_m$, Ym, Zm are the tristimulus values of net luminaire output.

Finally, net luminaire output can be converted back to xyY chromaticity coordinates via the following equations.

$$x_m = \frac{X_m}{X_m + Y_m + Z_m} \quad \text{(Eq. 7)}$$

$$y_m = \frac{Y_m}{X_m + Y_m + Z_m} \quad \text{(Eq. 8)}$$

$$Y_m = Y_m \quad \text{(Eq. 9)}$$

Therefore, by choosing appropriate chromaticities and flux content of various luminous regions, net chromaticity and flux content of a luminaire can both be set to predefined targets. Additionally, component colors and their respective flux values can be re-configured via electronic controls, or can even be continuously dynamically adjusted while maintaining a constant net target light output in terms of both chromaticity and total luminous flux. Any set of colors, weighted by their respective flux content, that add to a target output light color are herein defined as being complementary with respect to the target color.

FIGS. 3A and 3B illustrate a minimum resolvable feature from the perspective of a viewer of a composite light source, and features that are less than the minimum resolvable. In embodiments, luminaires herein may include light emitters that emit light of fixed wavelengths or wavelength ranges, and are organized in either fixed or composite ways to provide luminous regions. Luminous regions are defined herein as being large enough that under typical viewing conditions they are discernible to a viewer, while light emitters that form the luminous regions may not be individually discernible. In the embodiment illustrated in FIG. 3A, a portion 310 of composite light source 300 is at distance D1 from viewer 305. When viewer 305 is at a distance D1 from portion 310 of composite light source 300, portion 310 subtends an angle of A1 within viewer 305's field of view. Portion 310 is minimally resolvable to a human with nominal visual acuity when angle A1 is about one arc minute, equivalent to a diameter of portion 310 being about 0.58 mm when distance D1 is about 2 meters. FIG. 3B provides a detailed schematic illustration of portion 310, FIG. 3A.

FIG. 3B shows light emitters 320 within portion 310 of composite light source 300. Generally speaking and not by way of limitation, the intent of composite light source embodiments herein is that at a typical viewing distance, individual light emitters may not be resolvable by a human viewer, while luminous regions are resolvable. Thus, when distance D1 in FIG. 3A is about 2 meters, light emitters 320 may not be resolvable to viewer 305 having nominal human visual acuity when a distance D2 between adjacent light emitters 320 is 0.5 mm or less. Therefore, in a first example, for typical room-scale interior light sources operating at working distances similar to about 2 meters from human viewers, embodiments herein advantageously form luminous regions that are larger in size than about 0.58 mm, while such regions may be formed from light emitters spaced apart from each other by 0.5 mm or less. In these embodiments, the luminous regions can be individually resolved by a human of nominal visual acuity, while the individual light emitters may not be resolvable. Composite light sources embodying these sizes of luminous regions and spacings of individual light emitters may be for example on the order of 15 cm to 1.5 m in size (e.g., an overall size of composite light source 300). [This and a bunch of what follows are guesstimates—please change as desired] Because embodiments herein advantageously utilize light emitters that are small in size, they can produce high light output when needed, and can provide adjustable brightness levels, light emitting diodes (LEDs), including organic LEDs (OLEDs) may be advantageously used as the light emitters.

When composite light sources are intended for larger interior spaces, larger luminous regions may be required such that human viewers of normal visual acuity may resolve the luminous regions, and larger spacing among light emitters may be utilized, considering that the viewers will generally be further away from the composite light sources. In a second example, a composite light source for a large conference room, restaurant or small ballroom may operate at a working distance similar to about 3 m from human viewers, such that the minimum size of resolvable luminous regions would scale up to about 0.9 mm and the maximum size of unresolvable emitter spacings would scale up to about 0.85 mm. A light source for this second example, having these sizes of luminous regions and spacings of individual light emitters, may be on the order of 50 cm to 5 m in size. A composite light source for a theatre or arena may operate at a working distance similar to about 18 m from human viewers, such that the minimum size of resolvable luminous regions would scale up to about 5.3 mm and the maximum size of unresolvable emitter spacings would scale up to about 5 mm. A composite light source for this second example, having these sizes of luminous regions and spacings of individual light emitters, may be on the order of 1.5 m to 12 m in size.

The concepts of luminous regions composed of light emitters at sizes that are appropriate to a given installation can also be extended to composite light sources utilizing illumination panels, e.g., composite light source 100, FIG. 1 utilizing illumination panels 110, 115. For example, various ways may be employed to spread light from a single source, or blend light from a plurality of sources, to form each illumination panel 110, 115. Using visual resolution limitations to suggest a minimum area of illumination panels 110, 115 for a composite light source 100 for a typical room-scale application yields an estimate of about 0.2 to 0.25 mm$^2$ (for circular or square panels respectively, that are spaced at the human visual acuity limit of 0.5 mm for a 2 m working distance). Aesthetically, however, to avoid an appearance that is visually "busy," minimum panel areas may be advantageously at least 4 cm$^2$ (squares @ 2 cm/side) or even 25 cm$^2$ (squares @ 5cm/side). For a 6 m working distance, a minimum area of illumination panels 110, 115 for a composite light source 100 may be about 9 to 11 mm$^2$ (for circular or square panels respectively, assuming a human visual acuity limit of 1.7 mm for the 6 m working distance), or to avoid a "busy" appearance, minimum panel areas may be advantageously at least 36 cm$^2$ (squares @ 6cm/side) or even 225 cm$^2$ (squares @ 15 cm/side). For a 18 m working distance, a minimum area of illumination panels 110, 115 for a composite light source 100 may be about 20 to 25 mm$^2$ (for circular or square panels respectively, assuming a human visual acuity limit of 5 mm for the sixty foot working distance), or to avoid a "busy" appearance, minimum panel areas may be advantageously at least 400 cm$^2$ (squares @ 20 cm/side) or even 1600 cm$^2$ (squares @ 40cm/side).

In addition to light emitters being disposed in direct view of viewers, light emitters may be disposed behind a diffuser, a refractive element, or one or more similar optical elements. These optical elements may have the effect of increasing the distance between adjacent light emitters that is resolvable by the viewers. They also can, in embodiments, diffuse and/or refract differently in one direction than another, such that individual light emitters may become indistinguishable from one another at different distances from one another depending on a direction in which the light emitters are disposed adjacent to one another.

When a luminaire has an effective aperture with spatially uniform luminance, then its far-field luminous intensity in a given direction (e.g., its far field photometric distribution) can be defined as a mathematical product of luminance and projected area of the aperture in that direction. As a function of spherical coordinates θ (vertical angle) and φ (azimuthal angle), a far-field luminous intensity distribution of a luminaire can be represented by the following equation:

$$I(\theta,\phi) = L(\theta,\phi) \cdot A_p(\theta,\phi) \qquad \text{(Eq. 10)}$$

where
$I(\theta, \phi)$ is far field luminous intensity in direction $(\theta, \phi)$
$L(\theta, \phi)$ is luminance of the aperture in direction $(\theta, \phi)$
$A_p(\theta, \phi)$ is projected area of the aperture in direction $(\theta, \phi)$ If the luminance of an aperture is not spatially uniform, then an average luminance value may be used.

If a luminaire aperture consists of multiple regions, each with an effective aperture, of varying levels of luminance, then a net far-field luminous intensity in a given direction can be defined by a summation of each region's product of luminance and projected area in that direction:

$$I_{net}(\theta, \phi) = \sum_{i=1}^{n} L_i(\theta, \phi) \cdot A_{pi}(\theta, \phi) \qquad \text{(Eq. 11)}$$

where
$I_{net}(\theta, \phi)$ is net far field luminous intensity in direction $(\theta, \phi)$
$L_i(\theta, \phi)$ is luminance of an $i^{th}$ region in direction $(\theta, \phi)$
$A_{pi}(\theta, \phi)$ is projected area of the $i^{th}$ region in direction $(\theta, \phi)$
i is an indexing number designating the respective regions
n is the total number of regions Again, if the luminance of each region is not spatially uniform, then the average luminance value may be used.

If effective apertures of various regions remain constant over time, then the respective luminances of the regions can be varied in a wide variety of ways while maintaining a target far-field luminous intensity distribution that is a net constant. Embodiments herein compensate for increases in the luminance of some regions with decreases in the luminance level of other regions, and vice-versa.

FIG. 4A schematically illustrates components of a composite light source 400, in accord with embodiments herein. Light source 400 includes a structure 410 that supports a plurality of light emitters 420; a portion 425 includes examples of light emitters 420 and is schematically illustrated in greater detail in FIG. 4B. Light source 400 also includes a controller 430 that may contain one or more of a power supply 440, control logic 450, memory 455, output drivers 460, sensors 470 and/or a real-time clock 475. Light source 400 may also include further sensors 470, as well as user controls 480 and a user input port 490. Components of light source 400 may be, but need not be, located in a single housing; many variations are contemplated to support differing applications. For example, control logic 450 and memory 455 may be housed in one location while power supply 440 and output drivers 460 are housed in another location (e.g., near or integrated with structure 410). Furthermore, sensors 470, user controls 480, user input port 490, and controller 430 may be structurally integrated with, or separate from, structure 410. Arrows in FIG. 4A denote flow of information and signals among components thereof; information or signals may be transferred among the components through electrical or optical connections, or wirelessly, utilizing known communication protocols.

FIG. 4B schematically illustrates light emitters 420 in portion 425 of FIG. 4A. In the example of FIG. 4B, light emitters 420(1), 420(2), 420(3) and 420(4) are red, green, blue and "white" LEDs, shown with labels R, G, B and W respectively; however other combinations of colors and/or light emitters 420 may be utilized. For example, light emitters such as multiple LED chips (e.g., red, green, blue, or other color combinations, with or without phosphors) in a single package, incandescent bulbs with filters, liquid crystal based emitters, organic LED panels (OLEDs) or other light emitters, may be utilized. Also, light emitters 420 may be of any color, although as discussed below, it may be advantageous to provide individual light emitters with colors that enable combination into luminous regions of complementary colors. LEDs are therefore an advantageous choice as light emitters 420 because of their wide availability in a variety of colors, and their tolerance for operation in both full-on and dimmed states, so that complex and/or dynamic color combinations can be formed using some LEDs operating at maximum intensity, and others that are partially dimmed. "White" light emitter 420(4) typically includes a blue semiconductor LED and a phosphor that downshifts some of the blue light emitted by the semiconductor LED into lower energy light (e.g., green, red and/or yellow) to provide a "white" appearance as judged by human viewers, but may not provide the same spectral distribution as incandescent "white" light. Embodiments herein that utilize white LEDs may treat the output of such LEDs as simply "white" or may treat it as a fixed combination of colors that is then added selectively to other colors to form luminous regions of specific colors, as described elsewhere herein. For example, embodiments different from that illustrated in FIG. 4B may not use "white" LEDs at all, but may utilize only red, green and blue or other combinations of light emitters capable of additively generating a variety of colors that are complementary to white or to another target color.

Light emitters 420 are advantageously mounted in close proximity with one another upon or within structure 410 such that individual ones of light emitters 420 are not resolvable by a human viewer at a typical viewing distance (such distance may vary according to individual applications, as discussed above with respect to FIGS. 3A, 3B). Light emitters 420 may be arranged upon a surface in rectilinear array fashion, as shown in FIGS. 4A and 4B, or may be arranged in other types of arrays, arranged in non-arrayed fashion upon a surface, or arranged (in arrayed or non-arrayed fashion) in three dimensional space.

In operation of composite light source 400, controller 430 controls light emitters 420 such that light emitters 420 form regions that are discernible to human viewers as being formed of multiple, static or changing, regions of color and/or luminance in a direct view (e.g., looking at light source 400) while a space that is illuminated by light source 400 receives a single target color at a constant illumination level. The target color is usually white or some variation thereof (e.g., various color temperatures of "white") but can be any color. A design goal of light source 400 may be to provide ambient task lighting (therefore, usually white) while making light source 400 interesting for viewers through presentation of one or more patterns of complementary colors and/or varying luminances that add up to the target color and luminous intensity. The patterns may also change over time, to provide further viewer interest. Controller 430 controls light emitters 420 so that the complementary colors can change in position, color, or luminance level or any combination thereof, while maintaining the target color and/or luminous intensity. Thus, the space that is illuminated by light source 400 continuously receives light that is satisfactory for general task lighting, but light source 400 provides a source of viewer interest not found in plain "white" (e.g., uncolored) and/or static lighting.

To do this, control logic 450 determines, at each point in time, a combination of two or more complementary colors that, weighted by the respective luminances and areas, form the target color, and a pattern in which the two or more colors may be displayed. Patterns may be generated randomly by control logic 450, may be based on templates provided through user input port 490 and/or may be stored in memory 455. Patterns input to light source 400 through user input port 490 can, in embodiments, be rejected, flagged or modified by control logic 450 to ensure an appropriate balance of color distributions. For example, if a binary image is provided in user input port 490, control logic may review the provided image to determine the ratio of areas to be rendered in a first color and a second color, so that the resulting far field distribution remains white (or other target color). If the binary image is too heavily weighted towards one color or the other, control logic 450 can either alert the user to the improper weighting, or modify the binary image to one with a more appropriate ratio of colors. Non-limiting examples of patterns that may be generated by control logic 550 include geometric shapes such as circles, squares, triangles, other polygons, random points or blocks of any shape; combinations or swirls based on any such patterns, and text; any such patterns may change over time, and may for example form swirling patterns such as simulated waterfalls, rain, tunnels or a "star field" effect in which objects appear to move toward or past a viewer.

Having determined a combination of colors and a pattern, control logic 450 generates an intensity state to which each light emitter 420 is to be set to achieve the colors and the pattern. In embodiments, this information is utilized to provide appropriate voltage and/or current input to each light emitter 420, using power from power supply 440. For example, having determined a level of light desired from each light emitter 420, control logic 450 may direct output drivers 460 to provide the appropriate voltage and/or current to each of the light emitters 420. Users of light source 400 can provide patterns to user input port 490 for storage in memory 455 and use by controller 430. Users of light source 400 can utilize user controls 480 to select attributes such as overall brightness, target color, complementary colors and patterns, and sequences of any of these attributes, to be provided by light source 400. Sensors 470, whether separate from or integrated with controller 430, can monitor the space that is illuminated by light source 400 (or can monitor some other space) and provide additional input to controller 430.

Controller 430 may also respond to time information from real-time clock 475 to adjust lighting provided by light emitters 420. For example, a target color projected by light emitters 420 may be adjusted to provide "white" light of a given color temperature as expected of natural daytime and/or seasonal variations. In another example, overall luminous intensity provided by light emitters changes to provide more light in early morning and/or evening hours for task lighting, but less light during the day when ambient light (e.g., sunlight) may be available in the illuminated space.

Figure 5A:
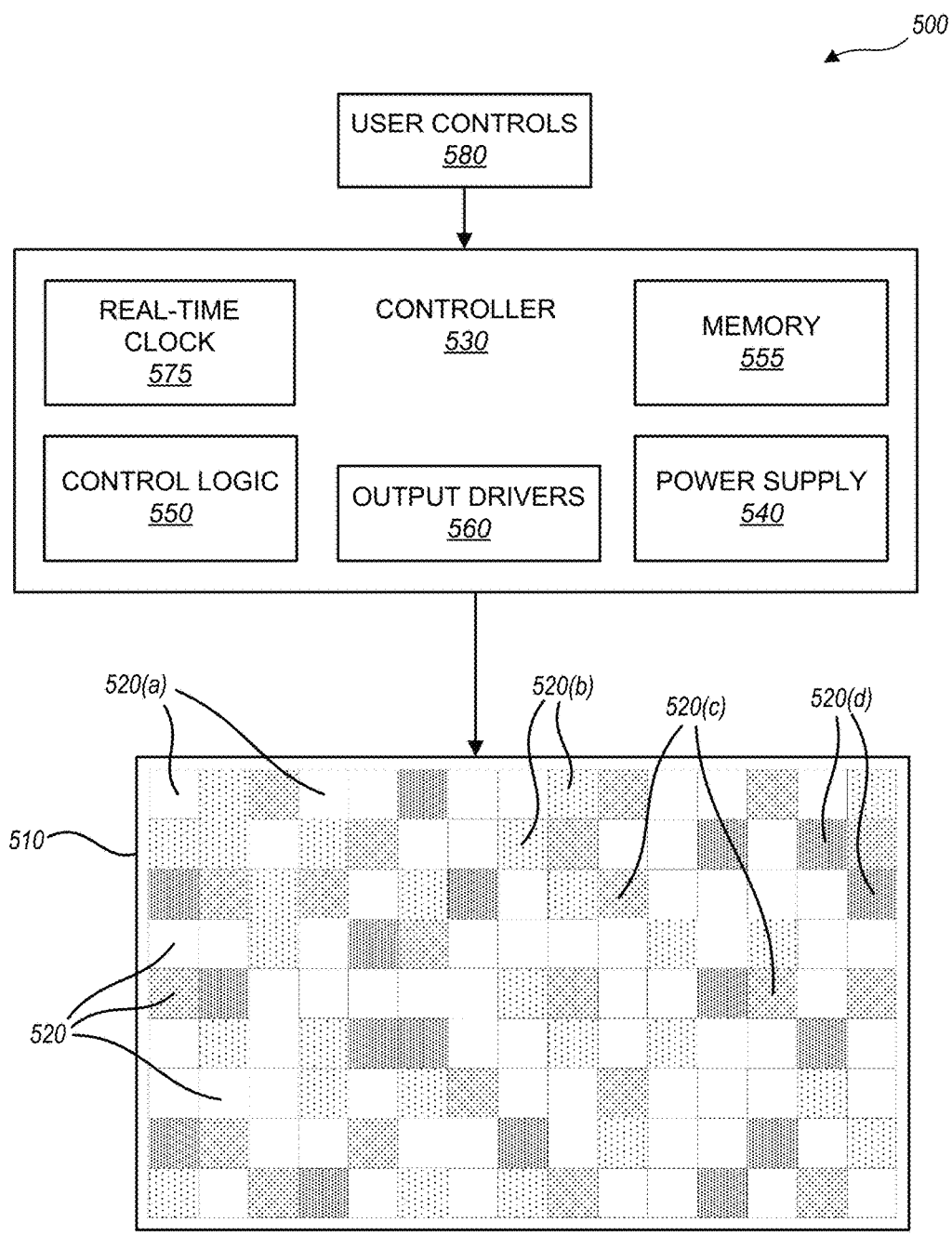
FIG. 5A schematically illustrates components of a composite light source, in accord with an embodiment.

FIG. 5A schematically illustrates components of a composite light source 500, in accord with embodiments herein. Composite light source 500 includes many components similar to those found in composite light source 400. Composite light source 500 includes a structure 510 that supports a plurality of illumination panels 520; structure 510 need not be a rectilinear array as shown but could be any kind of structure, including a plurality of structures connected by wiring (see also FIG. 5B). For example, in embodiments, structure 510 may be a series of strips of illumination panels 520 configured for embedding in a ceiling. In the embodiment illustrated in FIG. 5A, illumination panels 520 of light source 500 are of a given perceived color (but other embodiments may include light emitters of more than one perceived color, or of variable colors). Particular ones of the illumination panels 520 emit light with differing characteristics from one another, such characteristics may include luminance, color or both. For example illumination panels 520(*a*) emit light with relatively high luminance, illumination panels 520(*b*) emit light with somewhat lower luminance, illumination panels 520(*c*) emit light with lower luminance still, and illumination panels 520(*d*) emit light with lower luminance still (only two instances each of illumination panels 520(*a*), 520(*b*), 520(*c*) or 520(*d*) are labeled in FIG. 5A, for clarity of illustration). Light source 500 also includes a controller 530 that may contain one or more of a power supply 540, control logic 550, memory 555, output drivers 560, and/or a real-time clock 575. Light source 500 may also include user controls 580. Components of light source 500 may be, but need not be, located in a single housing; many variations are contemplated to support differing applications. For example, control logic 550 and memory 555 may be housed in one location while power supply 540 and output drivers 560 are housed in another location (e.g., near or integrated with structure 510). Furthermore, user controls 580 and controller 530 may be structurally integrated with, or separate from, structure 510. Arrows in FIG. 5A denote flow of information and signals among components thereof; information or signals may be transferred among the components through electrical or optical connections, or wirelessly, utilizing known communication protocols.

Composite light source 500 illustrates an embodiment that provides projected light of a constant perceived color for ambient task lighting; such light is therefore typically "white" but could be of any target color. That is, illumination panels 520 may provide projected light that is of a single color, but is of differing luminous intensity from one illumination panel 520 to the next, or of differing colors, with the net projected light being of one target color. The relative luminous intensities and/or colors of illumination panels 520 may be static or may vary at any given point in time. User controls 580 may be as simple as on/off and/or dimmer switches, or may provide more complex information to controller 530, such as information about how to vary lighting based on time of day, day of week or season of year, or to select from various options for dynamic variations of lighting levels provided by illumination panels 520.

Figure 5B:
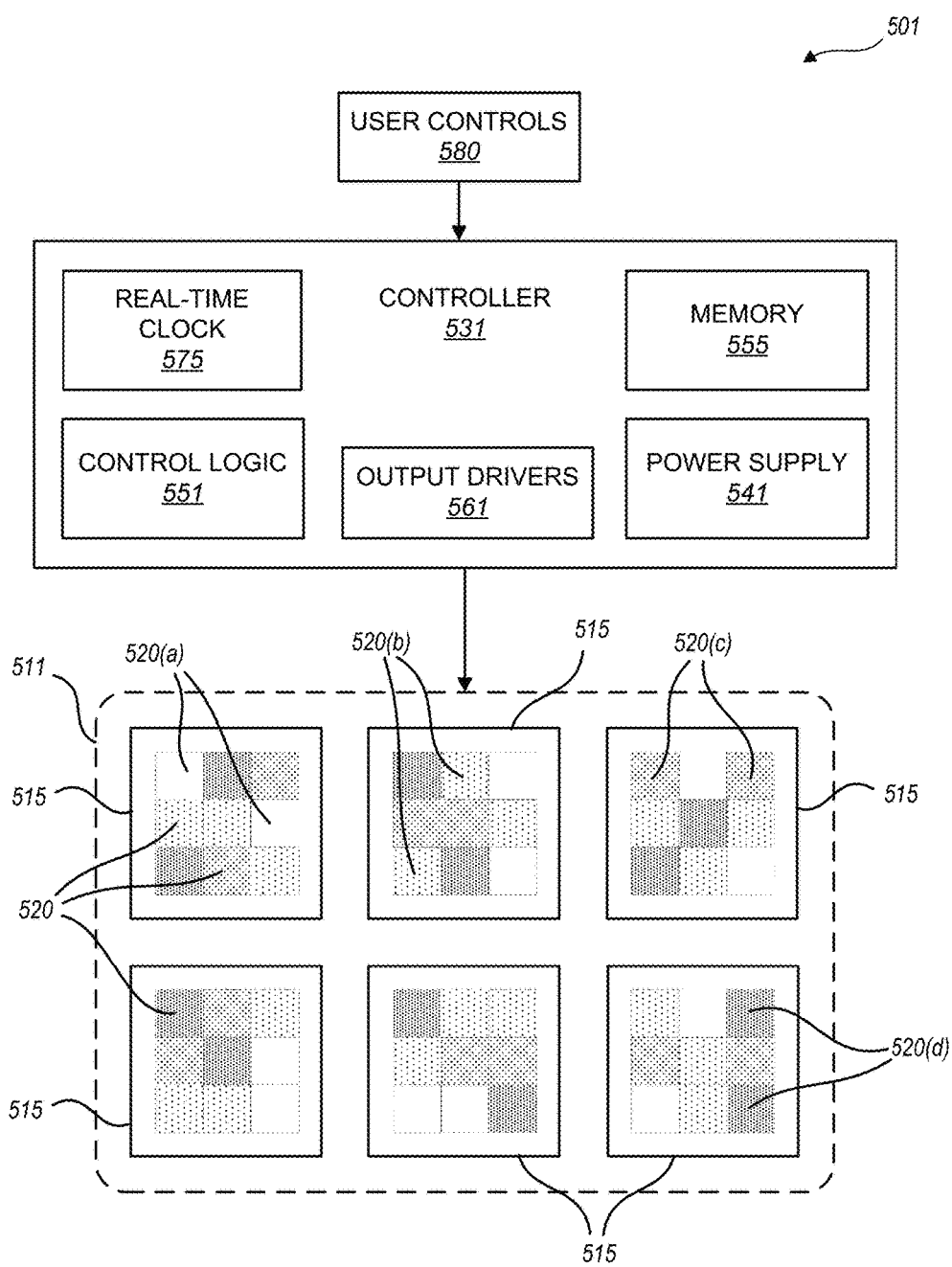
FIG. 5B schematically illustrates components of a composite light source, in accord with an embodiment.

FIG. 5B schematically illustrates components of a composite light source 501, in accord with embodiments herein. Composite light source 501 includes many components similar to those found in composite light sources 400 and 500. Composite light source 501 includes a luminaire arrangement 511 having a plurality of luminaires 515, each luminaire 515 having, in turn, a plurality of illumination panels 520, as shown. Arrangement 511 need not be a rectilinear array as shown but could be any kind of arrangement of luminaires 515, in a common physical structure or as a group of physically separate luminaires 515 interfacing with a common controller 531. Similarly, the layout of each luminaire 515 with nine illumination panels 520 is exemplary only, a luminaire 515 may have any number or layout of illumination panels 520. Arrows in FIG. 5B denote flow of information and signals among major components thereof; information or signals may be transferred among the components through electrical or optical connections, or wirelessly, utilizing known communication protocols. Connections from a controller 531 to and among the various luminaires 515 of arrangement 511 are not shown, for clarity of illustration, but such connections may be made by wiring and/or wirelessly. In the embodiment illustrated in FIG. 5B, illumination panels 520 of light source 501 are of a given perceived color (but other embodiments may include light emitters of more than one perceived color, or of variable colors). In light source 501, like light source 500, particular ones of the illumination panels 520 emit light with differing characteristics from one another, such characteristics may include luminance, color or both. For example, illumination panels 520(a) emit light with relatively high luminance, illumination panels 520(b) emit light with somewhat lower luminance, illumination panels 520(c) emit light with lower luminance still, and illumination panels 520(d) emit light with lower luminance still. In the embodiment shown, each luminaire 515 of arrangement 511 includes two illumination panels 520(a), three illumination panels 520(b), two illumination panels 520(c) and two illumination panels 520(d), with placement of illumination panels 520(a), 520(b), 520(c) and 520(d) being rearranged within each luminaire 515. Thus, each luminaire 515 will provide the same net illumination as each other luminaire 515, but the direct views of luminaires 515 will differ from one another, for an aesthetically interesting appearance.

Light source 501 also includes controller 531 that may contain one or more of a power supply 541, control logic 551, memory 555, output drivers 561, and/or a real-time clock 575. Light source 501 may also include user controls 580. Components of light source 501 may be, but need not be, located in a single housing; many variations are contemplated to support differing applications. For example, control logic 551 and memory 555 may be housed in one location while power supply 541 and output drivers 561 are housed in another location (e.g., near or integrated with arrangement 511). Furthermore, user controls 580 and controller 531 may be structurally integrated with, or separate from, arrangement 511.

Figure 6:
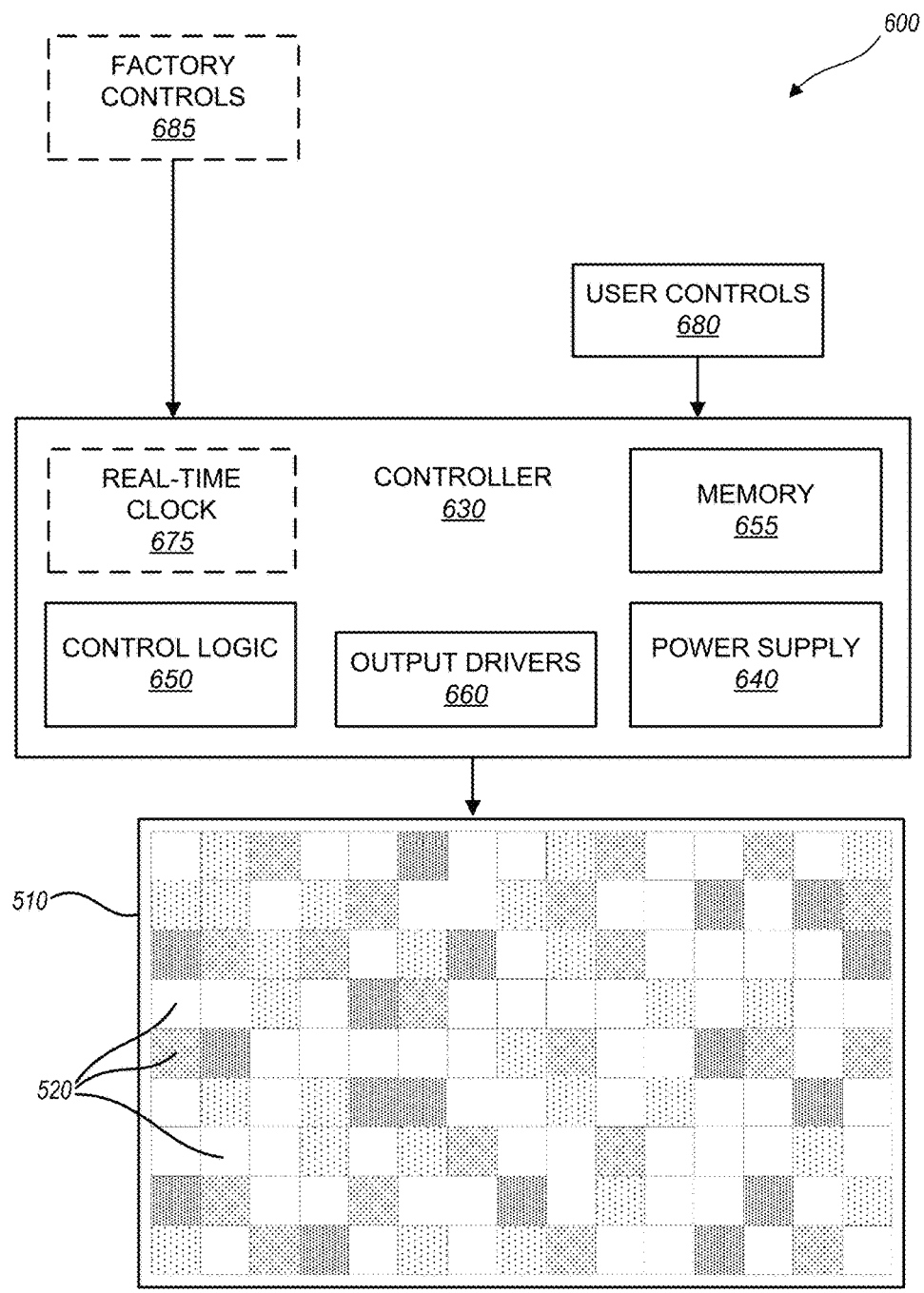
FIG. 6 schematically illustrates components of a composite light source, in accord with an embodiment.

FIG. 6 schematically illustrates components of a composite light source 600, in accord with embodiments herein. Components 630, 640, 650, 655, 660 and 675 of composite light source 600 are substantially similar to similarly named components in composite light source 500, FIG. 5, and structure 510 and illumination panels 520 are identical to those shown for composite light source 500. Real-time clock 675 is an optional component in composite light source 600.

During manufacturing and/or initial installation, light source 600 is responsive to factory controls 685. Factory controls 685 may interact with controller 630 through a connector that is attached in the factory or installation site and later removed, or through known wireless and/or optical methods. In certain embodiments, a primary setup is provided by interaction of factory controls 685 with controller 630, and remains fixed (e.g., as instructions coded within memory 655) throughout operation of light source 600. In other embodiments, a primary setup provided by interaction of factory controls 685 with controller 630 controls certain aspects of operation of light source 600, while controller 630 continues to control other aspects. For example, differing luminous intensities of illumination panels 520 may be originally set through interaction of factory controls 685 with controller 630, and remain fixed thereafter, but controller 630 may continue to apply overall luminous intensity changes to illumination panels 520 (e.g., to implement time of day, day of week and/or season of year based variations in lighting). While user controls 580 are also shown as part of light source 600, user controls 580 may be as simple as on/off and/or dimmer switches.

It should be understood that composite light sources 400, 500 and 600 provide successively decreasing levels of functionality and therefore cost, as may be appropriate for specific lighting applications. Therefore it should also be understood that embodiments having feature sets that are intermediate to the features shown in composite light sources 400, 500 and 600 are also contemplated herein.

Figure 7A:
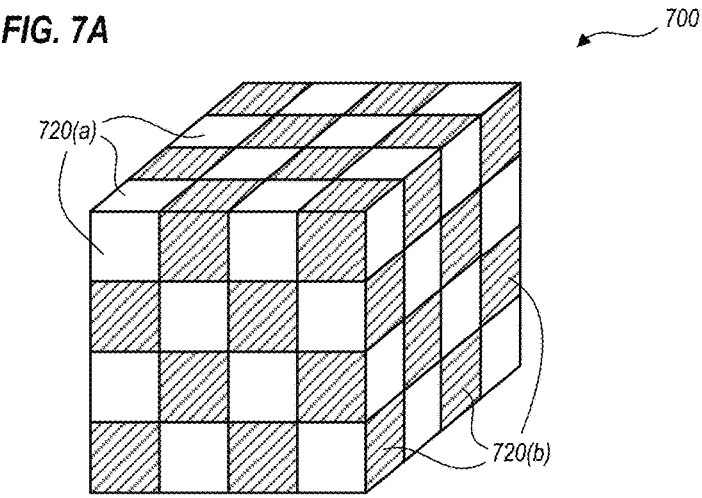
FIGS. 7A, 7B and 7C illustrate composite light sources that have illumination panels arranged thereon, in accord with embodiments.
Figure 7B:
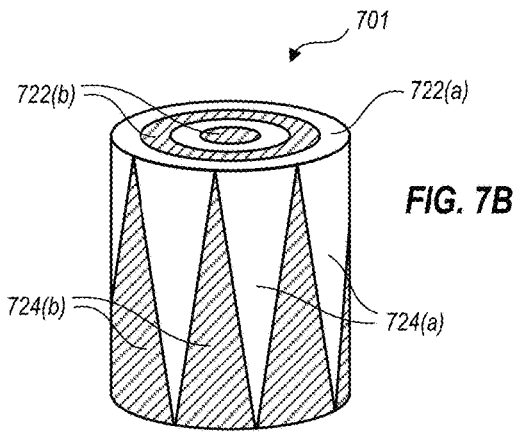
Figure 7C:
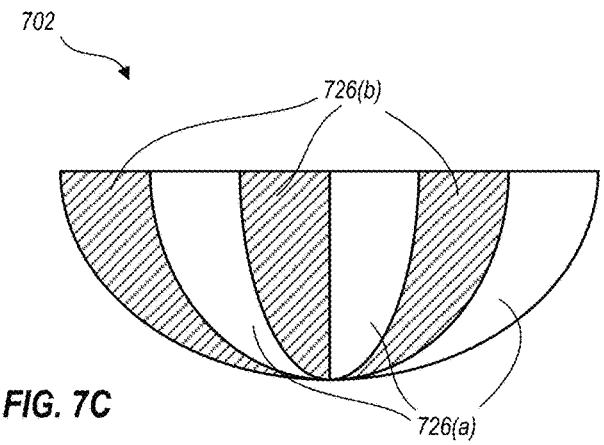

FIGS. 7A, 7B and 7C illustrate composite light sources 700, 701 and 702 respectively, that have illumination panels arranged thereon, in accord with embodiments. Composite light source 700 forms a cube shape, shown in perspective view, with square illumination panels 720(a) and 720(b) arranged thereon. Composite light source 701 forms a cylinder, shown in perspective view, having triangular illumination panels 724(a) and 724(b) on a side surface thereof and annular illumination panels 722(a) and 722(b) on a top surface thereof. Composite light source 702 forms a semi-sphere, shown in side elevation, having segment-shaped illumination panels 726(a) and 726(b) on a downwardly facing surface thereof. Only representative ones of illumination panels 720, 722, 724 and 726 are labeled in FIGS. 7A, 7B and 7C, for clarity of illustration. In each of composite light sources 700, 701 and 702, the illumination panels designated as (a) emit light of a first color, and the illumination panels designated as (b) emit light of a complementary color thereto, such that a far field photometric distribution thereof formed by projected light from the (a) and (b) panels is of a target color, which may be white. The (a) and (b) illumination panels may change in color and/or luminous intensity over time, with the changes arranged such that the target color and luminous intensity of the far field photometric distribution remain about constant.

Figure 8:
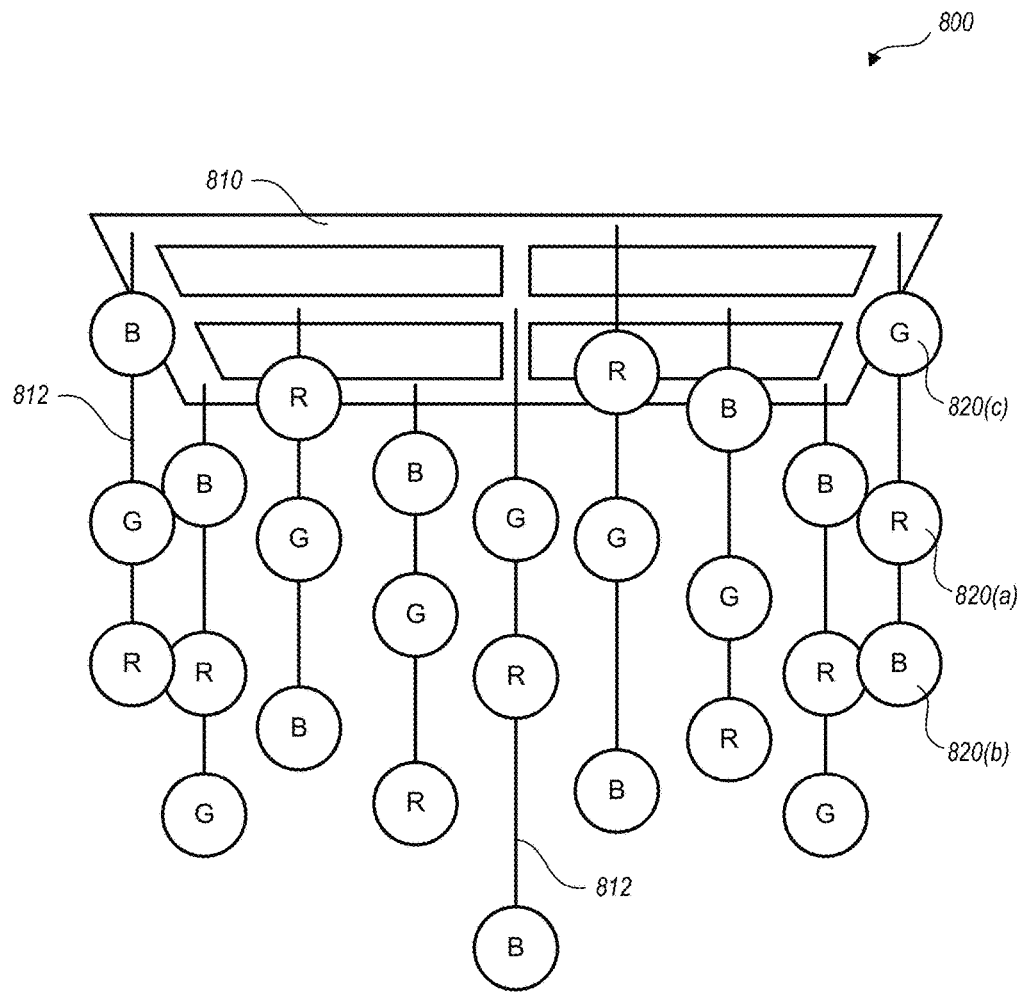
FIG. 8 illustrates a composite light source, in accord with an embodiment.

FIG. 8 illustrates a composite light source 800, in accord with an embodiment. In composite light source 800, illumination panels 820(a), 820(b) and 820(c) are suspended from a structure 810 by cables 812; only a small number of illumination panels 820(a), 820(b) and 820(c) and cables 812 are labeled in FIG. 8, for clarity of illustration; however each illumination panel 820(a) is labeled with an R, each illumination panel 820(b) is labeled with a B, and each illumination panel 820(c) is labeled with a G. Thus, composite light source 800 provides a three-dimensional structure of illumination panels 820, in a direct view. Illumination panels 820 are illustrated as spheres, but may be of any shape. Illumination panels 820(a), 820(b) and 820(c) emit light that is complementary to one another to form a far field photometric distribution of a target color. For example, the light emitted by illumination panels 820(a), 820(b) and 820(c) may be red, blue and green respectively, such that the target color is white. Illumination panels 820(a), 820(b) and 820(c) may change in color and/or luminous intensity over time, with the changes arranged such that the target color and luminous intensity of the far field photometric distribution remain about constant.

Further embodiments include, but are not limited to, the following. In one embodiment, a composite light source includes a structure having surfaces on which light emitters are mounted, and/or light emitters arranged in space (e.g., light emitters may be mounted on an open lattice type structure, supported in space by transparent support members, and/or encased in a transparent matrix, and the like). The light emitters may be of individual colors that can, by selective operation and/or mixing, additively produce "white" light as disclosed herein, or another color of light, in a far field photometric distribution. Alternatively, the light emitters may be of a single color; luminance of the light emitters may vary over time such that the net far field luminous intensity is nearly constant although the far field luminous intensity is coming from different light emitters at different times. The average color in the far field photometric distribution, whether "white" or something else, will be called the "target color" for purposes of the following discussion.

The light emitters may be positioned indistinguishably adjacent to one another in space, and controllable such that groups of the individual light emitters form visually distinct luminous regions, or the light emitters may be positioned distant to one another such that individual ones of the light emitters are discernible to a viewer. The luminous regions and/or individual ones of the light emitters may be of complementary colors such that at a distance from the light source, the colors combine to project the target color into the illuminated space. That is, the colors of the luminous regions or individual light emitters will be seen by a viewer who looks at the light source, but the composite photometric distribution of the projected light will be of the target color. The individual light emitters may be controlled such that luminous regions formed thereby change over time, but the complementary nature of the colors emitted thereby is retained such that the target color remains constant or nearly constant. Again, "nearly constant," "about the same," "roughly constant" and similar terms herein, in the context of color, refer to projected light having a net chromaticity that is within a ten step MacAdam ellipse in color variability, although certain embodiments may limit net chromaticity to within a five step MacAdam ellipse. The complementary colors may be in pairs, threes or some other multiple, but always sum to form the target color. The luminous regions may be fixed in location in the composite light source, or may change over time by controlling the light emitters. That is, light emitters may be controlled such that a given light emitter may appear to be part of a first luminous region at a first point in time, but the same light emitter may appear to be part of a different luminous region at a different point in time. Similarly, a composite light source may have emitters of a single target color (e.g., white) that individually vary in intensity over time, while a net projected light output of the light source remains constant.

For example, a surface of a composite light source may have light emitters that are individually addressable, and are spread over the surface. In aspects, the light emitters may be arranged and addressable as elements of a rectilinear array, a hexagonal array, a polar array, any other form of array or in a non-arrayed (e.g., random or pseudo-random) arrangement. The light emitters may be activated such that at a first time, light from the light emitters forms luminous regions of a first color, and regions of a second color that is complementary to the first color with respect to a target color. The luminous regions may be geometric in nature (e.g., stripes, triangles, squares, other polygons, circles, ellipses and the like), may form letters or numbers (in random order, or forming one or more text strings), may be based on a monochromatic image (e.g., a picture reduced to a two-valued image, like a "black and white" image with the "black" and "white" being the complementary colors), may be algorithmically derived, or may be random. In embodiments, a user may specify (e.g., utilizing user controls 480, FIG. 4A) a color, and a controller of the composite light source (e.g., controller 430, FIG. 4A) responds by determining a complementary color thereto, and the composite light source may display the user-specified color such that the user-specified color and the complementary color form a white projected color on nearby surfaces. In other embodiments, users may specify multiple color options, such as picking two (or more) colors, with the composite light source providing output of the complementary colors so that the users can see if a target color, formed by the colors and projected on nearby surfaces, is satisfactory. In still other embodiments, a controller of the composite light source may adjust one or both of colors intended as complementary colors such that a specified target color is formed thereby. The complementary colors may vary extremely from one another (e.g., colors from near the edges of the CIE 1931 color space) or they may vary less from one another (e.g., colors that are near to, but on opposite sides from, "white" or other target color in the color space). Small, random luminous regions that change over time may generate a "shimmer" effect that is preferable in some applications, in that identifiable and thus potentially distracting shapes or images are not generated. Algorithms for generating patterns, and system implementations of such algorithms, may include randomizers to generate effects that include such random variations, random seed patterns, random choices of text and images, and the like so as to avoid presentation of repetitive patterns to viewers.

Over time, the individual light emitters can be controlled such that the complementary colors change in hue and/or brightness so that the luminous regions appear, at a second and/or subsequent times, different in color (remaining complementary) or in shape from their appearance at the first time, or converge on the target color.

In one embodiment, the individual light emitters are all activated at a first time such that the surface uniformly presents the target color. Over a time period, individual ones of the light emitters increase in brightness while others decrease in brightness, until at a second time, visually distinct luminous regions are discernible by a viewer. The luminous regions form a first pattern, and the regions are of first complementary colors such that the far field photometric distribution remains of the target color. Over another time period, individual ones of the light emitters increase in brightness while others decrease in brightness, until at a third time the surface is again uniformly of the target color. Over another time period, individual ones of the light emitters increase in brightness while others decrease in brightness, until at a fourth time, visually distinct luminous regions are again discernible by a viewer. The luminous regions form a second pattern that is different from the first pattern, and the regions are of second complementary colors such that the far field photometric distribution remains of the target color. The second complementary colors may be the same as the first complementary colors, or they may be different. Over another time period, individual ones of the light emitters increase in brightness while others decrease in brightness, until at a fifth time the surface is again uniformly of the target color in appearance. The composite light source of this embodiment continues to oscillate between a uniform appearance of the target color, and one or more appearances characterized by luminous regions of complementary colors that continue to provide a far field photometric distribution of the target color.

Further variations are also possible; for example, individual ones of the light emitters may be manipulated to form patterns of luminous regions that shift from one pattern to another without reverting to the target color in between; different complementary color sets may be implemented at varying times, the patterns formed by the luminous regions may vary in size, shape and number. The luminous regions may have well defined boundaries, or there may be transitional areas between the regions wherein the individual light emitters are controlled so as to provide blending between the regions. Also, some of the luminous regions may remain constant while others change, care being taken to preserve the overall far field photometric distribution of the target color. Still other embodiments may provide light emitters having unchanging color, but with changing luminance, such that the far field photometric distribution is nearly constant in luminous intensity but individual source(s) of the luminous intensity fade in and out.

Embodiments herein may also be interactive, that is, effects therein may be driven in a temporal sense by external input other than time. For example, timing or type of changes in luminous regions discussed above may be driven by noise levels or specific sounds within an interior space or in the vicinity of the light source. A peaceful visual environment of no changes, slow changes, minimal color changes or "shimmer" effects as discussed above may be provided when the interior space is silent or provides low noise levels, while loud or chaotic noises may trigger a more exciting visual environment characterized by large color changes, rapid changes among colors and/or patterns, and use of certain patterns. Detection of rhythmic beats in room noise may be used to synchronize behavior of the light source to the beats. In some embodiments, motion sensors are utilized to tailor lighting to usage of an interior space, e.g., by providing more light in parts of the space where people appear to be, based on input from the sensors. Interactive responses to these and other external cues can heighten appeal to viewers.

Still other embodiments herein may provide slowly time-varying changes in the far field photometric distribution. For example, a composite light source may provide a target color, as discussed above, that slowly varies according to time of day, to simulate natural daylight changes; the target color itself may also be chosen to vary from day to day, for example varying throughout the year to mimic natural daylight variations. The range and rate of variation may be stored in memory of a composite light source (e.g., memory 455, FIG. 4A) where it can form a reference for the lighting provided on a given date and/or time. Other changes are also possible to provide a light source that provides points of visual interest for viewers, through differences in color, luminance or dynamics, within a space that is illuminated by the light source.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described, are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A composite light source, comprising:
a plurality of illumination panels; and
a controller; wherein the controller:
receives a user input that defines one or more user-preferred colors,
calculates one or more colors that are complementary to the one or more user-preferred colors, such that a sum of the user-preferred colors and the one or more colors that are complementary to the user-preferred colors, provides a net lumen output and a net chromaticity;
controls one or more of the illumination panels to emit the user-preferred colors, and
controls one or more others of the illumination panels to emit the one or more colors that are complementary to the user-preferred colors,
such that a far field photometric distribution of the composite light source provides the net lumen output and the net chromaticity.

2. The composite light source of claim 1, wherein:
the one or more colors required for the far field photometric distribution of the composite light source to achieve the net lumen output and the net chromaticity consist of a single color.

3. The composite light source of claim 1, wherein:
the one or more colors required for the far field photometric distribution of the composite light source to achieve the net lumen output and the net chromaticity comprise a plurality of colors.

4. The composite light source of claim 1, wherein:
the controller receives a user input that defines the net lumen output.

5. The composite light source of claim 1, wherein:
the controller receives a user input that defines the net chromaticity.

6. The composite light source of claim 1, wherein:
the net chromaticity is white, wherein white is a chromaticity that is within 0.05 Duv from a portion of the Planckian locus representing color temperatures between 2700K and 6500K.

7. The composite light source of claim 1, wherein the controller controls luminous intensities of the light emitted by at least some of the plurality of illumination panels to change over time in response to sound detected in the vicinity of the composite light source, while maintaining the far field photometric distribution at the same net lumen output.

8. The composite light source of claim 1, wherein the plurality of illumination panels is within a single luminaire, and the plurality of illumination panels is arranged in an array.

9. The composite light source of claim 8, wherein the number of illumination panels is nine, and the nine illumination panels are arranged in an array in the single luminaire.

10. The composite light source of claim 1, wherein multiple luminaires include the plurality of illumination panels.

11. The composite light source of claim 10, wherein each of the illumination panels is rectilinear, and the layout of each of the luminaires is a rectilinear array.

12. The composite light source of claim 1, wherein each of the illumination panels is square.

\* \* \* \* \*